US012807491B2

(12) United States Patent
Kim

(10) Patent No.: US 12,807,491 B2
(45) Date of Patent: Nov. 24, 2026

(54) METHOD FOR PREPARING SOLID ELECTROLYTE FOR SECONDARY BATTERY

(71) Applicant: INCHEMS CO., LTD, Ulsan (KR)

(72) Inventor: Hag Soo Kim, Ulsan (KR)

(73) Assignee: INCHEMS CO., LTD, Ulsan (KR)

( * ) Notice: Subject to any disclaimer, the term of this patent is extended or adjusted under 35 U.S.C. 154(b) by 636 days.

(21) Appl. No.: 18/265,001

(22) PCT Filed: Dec. 1, 2021

(86) PCT No.: PCT/KR2021/017963
§ 371 (c)(1),
(2) Date: Jun. 2, 2023

(87) PCT Pub. No.: WO2022/119299
PCT Pub. Date: Jun. 9, 2022

(65) Prior Publication Data

US 2023/0416091 A1 Dec. 28, 2023

(30) Foreign Application Priority Data

Dec. 3, 2020 (KR) ........................ 10-2020-0167126

(51) Int. Cl.

| | |
|---|---|
| ***C01B 25/14*** | (2006.01) |
| ***B01J 6/00*** | (2006.01) |
| ***C01D 15/04*** | (2006.01) |
| ***C01D 15/06*** | (2006.01) |
| ***H01M 10/0562*** | (2010.01) |

(52) U.S. Cl.
CPC ............... *C01B 25/14* (2013.01); *B01J 6/001* (2013.01); *C01D 15/04* (2013.01); *C01D 15/06* (2013.01); *H01M 10/0562* (2013.01); *H01M 2300/008* (2013.01)

(58) Field of Classification Search
CPC .... H01M 10/0562; C01B 25/14; C01D 15/04; C01D 15/06; B01J 6/00; B01J 6/001
USPC ......................................................... 429/322
See application file for complete search history.

(56) References Cited

U.S. PATENT DOCUMENTS

2021/0075056 A1 3/2021 Nakata et al.

FOREIGN PATENT DOCUMENTS

| | | | | |
|---|---|---|---|---|
| CN | 109417194 A | | 3/2019 | |
| JP | 2018156835 A | * | 10/2018 | ............ C01B 25/14 |
| JP | 2019-192598 A1 | | 10/2019 | |
| JP | 2020027715 A | | 2/2020 | |
| JP | 2020-075855 A | | 5/2020 | |
| KR | 20170056338 A | | 5/2017 | |
| KR | 20190062998 A1 | | 6/2019 | |
| KR | 20200077715 A | | 7/2020 | |
| KR | 20200108487 A | | 9/2020 | |
| WO | 2020050269 A1 | | 3/2020 | |
| WO | 2018-225526 A1 | | 4/2020 | |
| WO | 2022162085 A1 | | 8/2022 | |

OTHER PUBLICATIONS

Machine translation of JP 2018156835 A (Year: 2018).*
"A mechonochemical synthesis of submicron-sized Li2S and a mesoporous Li2S/C hybrid for high performance lithium/sulfur battery cathodes", Journal of Materials Chemistry A issued on Feb. 24, 2017.
"Solvent-Engineered Design Argyrodite Li6PS5X (X= Cl, Br, or I) Solid Electrolytes with High Ionic Conductivity", ACS Engery Letters issued on Nov. 20, 2019.

* cited by examiner

*Primary Examiner* — Kevin P Kerns
(74) *Attorney, Agent, or Firm* — NKL Law; Jae Youn Kim

(57) ABSTRACT

Provided is a method for preparing a solid electrolyte for a secondary battery, including the steps of: (S1) preparing a material composition having phosphorus (P) sulfide, a lithium halide and lithium sulfide; (S2) mechanically milling the material composition in a milling container; and (S3) calcining a compound obtained after the milling step, wherein the calcination step (S3) performs purging using gas.

1 Claim, 3 Drawing Sheets

METHOD FOR PREPARING SOLID ELECTROLYTE FOR SECONDARY BATTERY

TECHNICAL FIELD

This application claims the benefit of Korean Patent Application Publication No. 10-2020-0167126, filed in the Korean Intellectual Property Office on Dec. 3, 2020, which is hereby incorporated by reference in its entirety into this application.

The present disclosure relates to a method of preparing a solid electrolyte applicable to a secondary battery.

BACKGROUND ART

This section provides background art regarding the present disclosure which is not necessarily known art.

With recent remarkable development, technology for lithium secondary batteries has been applied to various fields, including electric vehicles and energy storage systems (ESS). While a currently available lithium secondary battery is composed of a positive electrode material, a negative electrode material, an electrolyte, and a separator, technology regarding the positive and negative electrode materials is being continuously developed to improve output. In addition, technology for separators is being developed in connection with the stability of current batteries using liquid electrolytes.

In the lithium secondary battery, materials capable of reversibly intercalating and deintercalating lithium ions are used as positive and negative electrodes, between which an organic or polymeric electrolyte solution is introduced to facilitate movement of the lithium ions, thereby producing electrical energy. In this case, when a short-circuit in which the positive and negative electrodes are in direct contact occurs, a rapid chemical reaction may result in an explosion caused by thermal runaway. For this reason, to obtain stability of a separator, efforts, including coating both sides of a separator with ceramic materials, have been made to improve the stability of the separator.

On the other hand, there have been efforts to switch electrolytes to inorganic solid electrolytes. In the case of secondary batteries composed of solid electrolytes, liquid electrolytes used in existing lithium secondary batteries are replaced with solid type. As a result, explosion and ignition caused by an electrolyte degradation reaction do not occur at all, and stability thus can be sharply improved. In addition, since lithium metal or lithium alloys can be used as negative electrode materials, there is an advantage in that energy density with respect to the mass and volume of the battery can be dramatically improved.

On the contrary, in the case of using solid electrolytes, the ionic conductivity thereof is low, and electrode/electrolyte interface conditions are poor compared to the case of using liquid electrolytes. For this reason, there is a disadvantage in that battery performance is degraded. Nevertheless, as long as solid electrolyte performance is to be improved, all-solid-state secondary batteries using solid electrolytes can be widely used.

The solid electrolyte candidates for all-solid-state lithium secondary batteries include gel-type polymer electrolytes, inorganic electrolytes, and the like. Inorganic solid electrolytes can be divided into oxide-based and sulfide-based solid electrolytes. Currently, a field of technology being actively developed is sulfide-based solid electrolytes. In addition, the sulfide-based solid electrolytes have an ionic conductivity of $10^{-2}$ S/Cm and have been developed into materials having an ionic conductivity close to the level of organic electrolytes.

Among these, the solid electrolyte candidate known as a material with relatively high ionic conductivity is LiPSX (X=Cl, Br, or I) argyrodite-type material. In particular, when optimally adjusting a molar ratio of LiPSX, the ionic conductivity is known to be substantially improved.

Typically, synthesis processes of sulfide-based solid electrolytes are divided into dry milling based on mechanical milling methods and wet milling involving reactions performed in a solution state. In the case of the dry processes, ionic conductivity is relatively good. However, in calcination processes, hydrogen sulfide (H2S) gas is generated during reaction processes of inorganic compounds, so stability may thus be problematic. In addition, in the process of removing the generated hydrogen sulfide gas, there is still a need to efficiently facilitate the reaction by preventing reactants from leaking out of the reaction system.

DOCUMENT OF RELATED ART

Patent Document (Patent Document 1) Korean Patent Application Publication No. 10-2019-0062998

(Patent Document 2) Japanese Unexamined Patent Application Publication No. 2019-192598

Non-Patent Document (Non-Patent Document 1) (Thesis 1) "A mechonochemical synthesis of submicron-sized Li2S and a mesoporous Li2S/C hybrid for high performance lithium/sulfur battery cathodes", Journal of Materials Chemistry A issued on 2017 Feb. 24.

(Non-Patent Document 2) (Thesis 2) "Solvent-Engineered Design Argyrodite Li6PS5X (X=Cl, Br, or 1) Solid Electrolytes with High Ionic Conductivity", ACS Engery Letters issued on 2019 Nov. 20.

DISCLOSURE

Technical Problem

To solve the above problems, one objective of the present disclosure is to provide a method of preparing a LiPSX (X=Cl, Br, or I) solid electrolyte. Specifically, in a calcination process performed after a milling step, another objective of the present disclosure is to provide a method of preparing a high-purity solid electrolyte with high reaction efficiency by adjusting a purge process for each calcination step.

However, objectives of the present disclosure are not limited to the objectives mentioned above, and other objectives not mentioned will become more apparent by those skilled in the art from the following description.

Technical Solution

In order to solve the above problems, provided is a method of preparing a solid electrolyte for a secondary battery, according one embodiment of the present disclosure, the method including the following steps:

One embodiment of the present disclosure provides a method of preparing a solid electrolyte for a secondary battery, the method including: S1 of preparing a raw material composition containing phosphorous (P) sulfide, a lithium halide, and lithium sulfide;

S2 of mechanically milling the raw material composition in a milling container to obtain a compound; and S3 of calcining the compound obtained through the mechanical milling, in which a purge process using a gas is performed in the S3 calcining.

In one embodiment of the present disclosure, the S3 calcining may include: S3-a of providing the compound obtained through the mechanical milling in a calcining furnace;

S3-b of heating the calcining furnace to a temperature of 500° C. or higher,

S3-c of maintaining the calcining furnace for 4 hours to 10 hours; and

S3-d of cooling the calcining furnace to room temperature.

In one embodiment of the present disclosure, the purge process using the gas may be performed in at least one of the S3-b heating, the S3-c maintaining, and the S3-d cooling.

In one embodiment of the present disclosure, the purge process using the gas may be performed in the S3-c maintaining and the S3-d cooling.

In one embodiment of the present disclosure, the purge process using the gas may be performed in the S3-b heating and the S3-d cooling.

In one embodiment of the present disclosure, the purge process may be performed at a temperature of 150° C. or lower in the S3-b heating.

In one embodiment of the present disclosure, the gas used in the purge process may include an inert gas.

In one embodiment of the present disclosure, the inert gas may be argon (Ar).

Advantageous Effects

In a method of preparing a solid electrolyte for a secondary battery, a purge process is effectively adopted during a calcination process, thereby lowering the loss of reactants to improve the overall reaction efficiency. As a result, a high-purity solid electrolyte can be obtained, and the ionic conductivity of the solid electrolyte thus can be further improved.

BEST MODE

Figure 1:
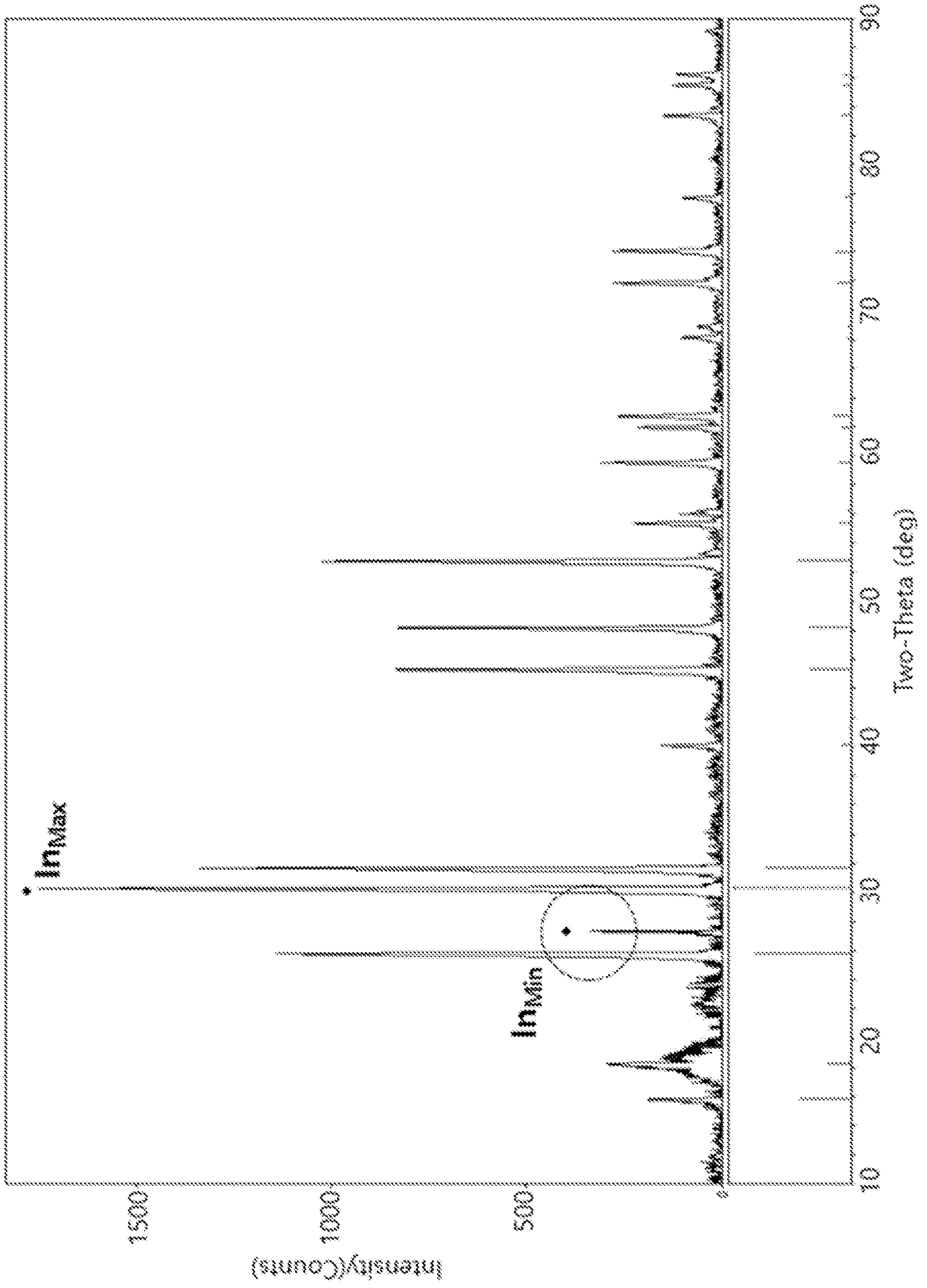
FIG. 1 is an X-ray diffraction pattern of an all-solid-state electrolyte compound prepared in Example 1.

Hereinbelow, the present disclosure will be described in detail. Terms used herein are selected to describe embodiments and thus should not be construed as the limit of the present disclosure. Unless otherwise specified, all terms including technical and scientific terms used herein have the same meaning as commonly understood by those skilled in the alt.

Throughout this specification and claims, the terms "comprise", "comprises", and "comprising", unless stated otherwise, specify the presence of stated objects, steps or a group of objects, and steps, but do not preclude the presence or addition of any other objects, steps or a group of objects, or a group of steps.

On the other hand, various embodiments and examples of the present disclosure can be combined with any other embodiments unless the text clearly indicates otherwise. In particular, some features indicated as being preferable or advantageous may be combined with any other features indicated as being preferable or advantageous.

Hereinafter, the present disclosure will be described in detail.

According to one embodiment of the present disclosure, provided is a method of preparing a solid electrolyte for a secondary battery including the following steps:

Specifically, one embodiment of the present disclosure provides a method of preparing a solid electrolyte for a secondary battery, the method including the following steps: a step S1 of preparing raw material composition containing phosphorous (P) sulfide, a lithium halide, and lithium sulfide;

a step S2 of mechanically milling the raw material composition in a milling container to obtain a compound; and a step S3 of calcining the compound obtained through the mechanical milling, in which a purge process using a gas is performed in the S3 calcining.

In this specification, the phosphorous (P) sulfide is a compound containing phosphorus and sulfur components, which may be $P_2S_5$.

In this specification, the lithium halide is a compound containing lithium and halogen components, which may be represented by LiX, where X may be chlorine (Cl), bromine (Br), or iodine (I).

In this specification, the lithium sulfide is not particularly limited. However, the lithium sulfide may typically be $Li_2S$, $Li_2S_2$, and the like, and may specifically be $Li_2S$.

In the embodiment, $Li_2S$ preferably has a uniform particle size distribution, which can be realized by adjusting milling conditions from the synthesis process of $Li_2S$.

In the present disclosure, the uniform particle size distribution means that a particle diameter coefficient of variation (CV value) is 20% or lower when being measured with a typical particle size analyzer.

In this case, amounts of the lithium sulfide, the phosphorus sulfide, and the lithium halide being mixed may be controlled in various ways depending on a molar ratio of a sulfide-based compound to be prepared, and is not particularly limited.

In one embodiment of the present disclosure, the method of preparing the solid electrolyte for the secondary battery may include the mechanically milling step of the raw material composition in the milling container. The milling step is performed to mix the raw material composition. The raw materials may be mixed by dry methods, which include mechanical milling. Mechanical milling is a method of obtaining a desired material in the process of pulverizing a raw material composition by providing mechanical energy to a sample, which may use, for example, a roll mill, a ball mill, or a jet mill.

In one embodiment of the present disclosure, the mechanically milling step of the raw material composition in the milling container may be performed in an environment where a force applied to the milling container is in a range of 60 G to 90 G. To set up the environment described above, process conditions for the mechanical milling may be appropriately adjusted according to equipment being used. The applied force may be in a range of 70 G to 80 G or a range of 73 G to 78 G.

In one embodiment of the present disclosure, the mechanically milling step of the raw material composition in the milling container may be performed under conditions of a rotation speed in a range of 100 rpm to 2,000 rpm, a range of 200 rpm to 1,500 rpm, or a range of 300 rpm to 1,000 rpm.

In one embodiment of the present disclosure, the mechanically milling step of the raw material composition in the milling container may be performed for less than 1 hour and specifically, for less than 30 minutes or 1 minute or more to 20 minutes.

In addition, in the case of applying a force in a range of 60 G to 90 G to a ball milling process, provided that the amount and size of particles are the same, the milling process time can be shortened, which is less than 1 hour. Under the same condition, the milling process time preferably ranges from 5 minutes to 45 minutes and more preferably, from 5 minutes to 30 minutes. When the milling process time exceeds 1 hour, a mixture may end up having an unintended crystal structure due to heat generated during the milling process, which may adversely affect ionic conductivity.

In one embodiment of the present disclosure, the mechanical milling may be ball milling. In the case of using the ball milling, the raw material composition is introduced into the milling container along with milling balls. The milling balls may be made of a metal oxide or ceramic oxide. Typically, the metal oxide may include tungsten oxide, and the ceramic oxide may include zirconia oxide.

On the other hand, the mechanical milling is performed based on a principle in which balls are conveyed to reach a predetermined height by the centrifugal force generated when the milling container rotates, and the material is pulverized while the balls fall. In this case, the mechanical milling may be performed by one-dimensional rotation in which the container is fixed while being rotated in only one direction. However, the mechanical milling may be performed by two-dimensional rotation in which the container is rotated in one direction while another axis responsible for fixing the container rotates. In addition, particle size distribution may be further precisely controlled by continuously or intermittently applying vibration to the rotating milling container.

In one embodiment of the present disclosure, the method of preparing the solid electrolyte for the secondary battery includes the step S3 of calcining the compound obtained through the mechanical milling. The calcining step is performed to improve the ionic conductivity of the solid electrolyte by crystallizing the solid electrolyte for the secondary battery.

In one embodiment of the present disclosure, the calcining step S3 may include: a step S3-a of providing the compound obtained through the mechanical milling in a calcining furnace; a step S3-b of heating the calcining furnace to a temperature of 500° C. or higher, a step S3-c of maintaining the calcining furnace for 4 hours to 10 hours; and a step S3-d of cooling the calcining furnace to room temperature.

In one embodiment of the present disclosure, the step S3-a of providing the compound obtained through the mechanical milling in the calcining furnace in the calcination step S3 may be performed by a method in which an object to be calcined is positioned on a flat plate in a box-type furnace. On the other hand, after placing a cylinder made of heat-resistant metal or quartz in the furnace, the object to be calcined may be introduced into the cylinder and then rotated to allow uniform heat transfer to the object to be calcined. When the cylinder-form container, as described above, is placed in the furnace and allowed to rotate for a uniform temperature gradient on the object to be calcined, the uniformity of the internal crystal distribution of the obtained solid electrolyte may be easily obtained, which may be advantageous in terms of improvement in the ionic conductivity of the solid electrolyte.

In one embodiment of the present disclosure, the step S3-b of heating the calcining furnace to a temperature of 500° C. or higher is included. In this case, a starting temperature of the calcining furnace before the heating step may be room temperature.

In one embodiment of the present disclosure, a heating rate in the step S3-b of heating the calcining furnace to a temperature of 500° C. or higher may be in a range of 1° C./min to 100° C./min, a range of 10° C./min to 50° C./min, or in a range of 10° C./min to 30° C./min.

In one embodiment of the present disclosure, a final temperature in the step S3-b of heating the calcining furnace to a temperature of 500° C. or higher may be in a range of 400° C. to 900° C., a range of 500° C. to 700° C., or a range of 500° C. to 550° C. At the heating rate and final temperature described above, damage to the object to be calcined may be minimized while effectively performing calcination.

In one embodiment of the present disclosure, the maintaining step of the calcining furnace for 4 hours to 10 hours is included. A maintaining temperature in the maintaining step may be the final temperature in the heating step. For example, in the heating step, the calcining furnace may be heated at a heating rate of 20° C./min to reach a final temperature of 550° C. and then maintained for 6 hours. Maintaining the calcining furnace means that the heated object is kept in the calcining furnace without additionally preforming heating.

In one embodiment of the present disclosure, the maintaining step may be performed in a state where the calcining furnace is in a closed system. The closed system means a state where there is no flow of gas inside/outside the calcining furnace.

In one embodiment of the present disclosure, the step S3-d of cooling the calcining furnace to room temperature may be included. In this case, a starting temperature of the calcining furnace in the cooling step may be the final temperature in the maintaining step.

In one embodiment of the present disclosure, the step of cooling the furnace to room temperature may be performed for 1 hour to 10 hours or for 2 hours to 8 hours.

In one embodiment of the present disclosure, the purge process using the gas may be performed in at least one of the heating, maintaining, and cooling steps. The purge process is a method of removing non-absorbed gas or vapor contained in a sealed space, which means that a neutral buffer gas, such as nitrogen, carbon dioxide, or air, is used to perform ventilation. In addition, the above process is performed to remove $H_2S$ gas generated during the calcination process, which may be performed by a method known to those skilled in the art. $H_2S$ gas is hazardous and explosive, and is thus required to be removed during the process. However, when performing the purge process, not only $H_2S$ gas but also a phosphorus sulfide compound (for example, $P_2S_5$), a reactant, may leak out.

In one embodiment of the present disclosure, the purge process using the gas may be performed in the maintaining and cooling steps.

In one embodiment of the present disclosure, the purge process using the gas may be performed in the heating and cooling steps.

In one embodiment of the present disclosure, the purge process using the gas may be performed in the heating, maintaining, and cooling steps.

In one embodiment of the present disclosure, the purge process may be repeatedly performed one or more times in the respective steps described above. For example, in the case of performing the maintaining step for 6 hours, the purge process may be each independently performed one time at a 2-hour point and a 4-hour point.

In one embodiment of the present disclosure, the purge process performed in the heating step may be performed at a temperature of 150° C. or lower. Specifically, when performing the purge process in the heating step, a temperature in the calcining furnace may be 150° C. or lower. In this case, the above-described $H_2S$ ventilation effect may be maintained while minimizing the loss of the phosphorus sulfide compound, the reactant.

In one embodiment of the present disclosure, the purge process performed in the cooling step may be performed at a temperature of 300° C. or lower. Specifically, when performing the purge process in the cooling step, a temperature in the calcining furnace may be 300° C. or lower.

In one embodiment of the present disclosure, the inert gas may be argon (Ar), nitrogen ($N_2$), or a mixed gas thereof.

In one embodiment of the present disclosure, the inert gas may be argon (Ar).

In one embodiment of the present disclosure, the solid electrolyte for the secondary battery prepared according to the preparation method described above may have a particle size (d50) in a range of 3 μm to 4 μm, which is a particle size set to exhibit the optimal effect by properly dispersing the solid electrolyte in the secondary battery, the end product. In the solid electrolyte for the secondary battery prepared through the processes according to one embodiment of the present disclosure, strong energy is applied to the milling process to make particle size before entering the calcining process sufficiently small. In addition, particle size distribution is allowed to be uniform, so there is an effect that the time required for the pulverization process can be also shortened.

MODE FOR INVENTION

Hereinafter, the present disclosure will be described with reference to embodiments.

Example 1

In a glove box filled with nitrogen, 0.2776 g of LiCl, 0.3672 g of $Li_2S$, 0.3552 g of $P_2S_5$, and 15 zirconia balls with a diameter of 10 mm were introduced into a 45-mL stainless steel pot. Then, the glove box was sealed. Milling was performed at a rotation speed of 350 rpm and a force of 75 G to obtain a primary reaction compound.

The primary reaction compound was introduced into a calcining furnace made of quartz, and a calcining step was then performed. The calcining step was composed of heating, maintaining, and cooling steps. In the heating step, the calcining furnace was heated at a rate of 20° C. per minute to increase a temperature up to 550° C. In the heating step, an argon purge process was performed at a 140° C.-point. The calcining furnace heated to a temperature of 550° C. was maintained for 6 hours to perform the maintaining step in which a reaction was performed. In the maintaining step, argon purging was performed at a 2-hour point and a 4-hour point.

After maintaining the calcining furnace at a temperature of 550° C. for 6 hours, the cooling step was performed. Cooling allowed the calcining furnace to reach room temperature through natural cooling. In the cooling step, argon purging was performed at 200° C.

An X-ray diffraction spectrum of powder obtained through the above process is shown in FIG. 1, in which $\ln_{max}$ indicates the maximum peak intensity, and $\ln_{min}$ indicates the peak intensity of lithium sulfide. The respective values thereof are shown in Table 1 below.

Example 2

As in Example 1, in the glove box filled with nitrogen, 12.637 g of LiCl, 34.237 g of $Li_2S$, 33.125 g of $P_2S_5$, and zirconia balls (130 g) with a diameter of 5 mm were introduced into a 150-mL polypropylene pot. Then, the glove box was sealed. Milling was performed at a rotation speed of 1,000 rpm for 10 minutes to obtain a primary reaction compound.

The primary reaction compound was introduced into a calcining furnace made of quartz, and a calcining step was then performed. The calcining step was composed of heating, maintaining, and cooling steps. In the heating step, the calcining furnace was heated at a rate of 3° C. per minute to increase a temperature up to 550° C. In the heating step, an argon purge process was not performed.

After the heating step, the calcining furnace heated to a temperature of 550° C. was maintained for 6 hours to perform the maintaining step in which a reaction was performed. During the maintaining step, argon purging was performed.

After maintaining the calcining furnace at a temperature of 550° C. for 6 hours, the cooling step was performed. Cooling allowed the calcining furnace to reach room temperature through natural cooling. In the cooling step, argon purging was performed up to a room-temperature point.

Figure 2:
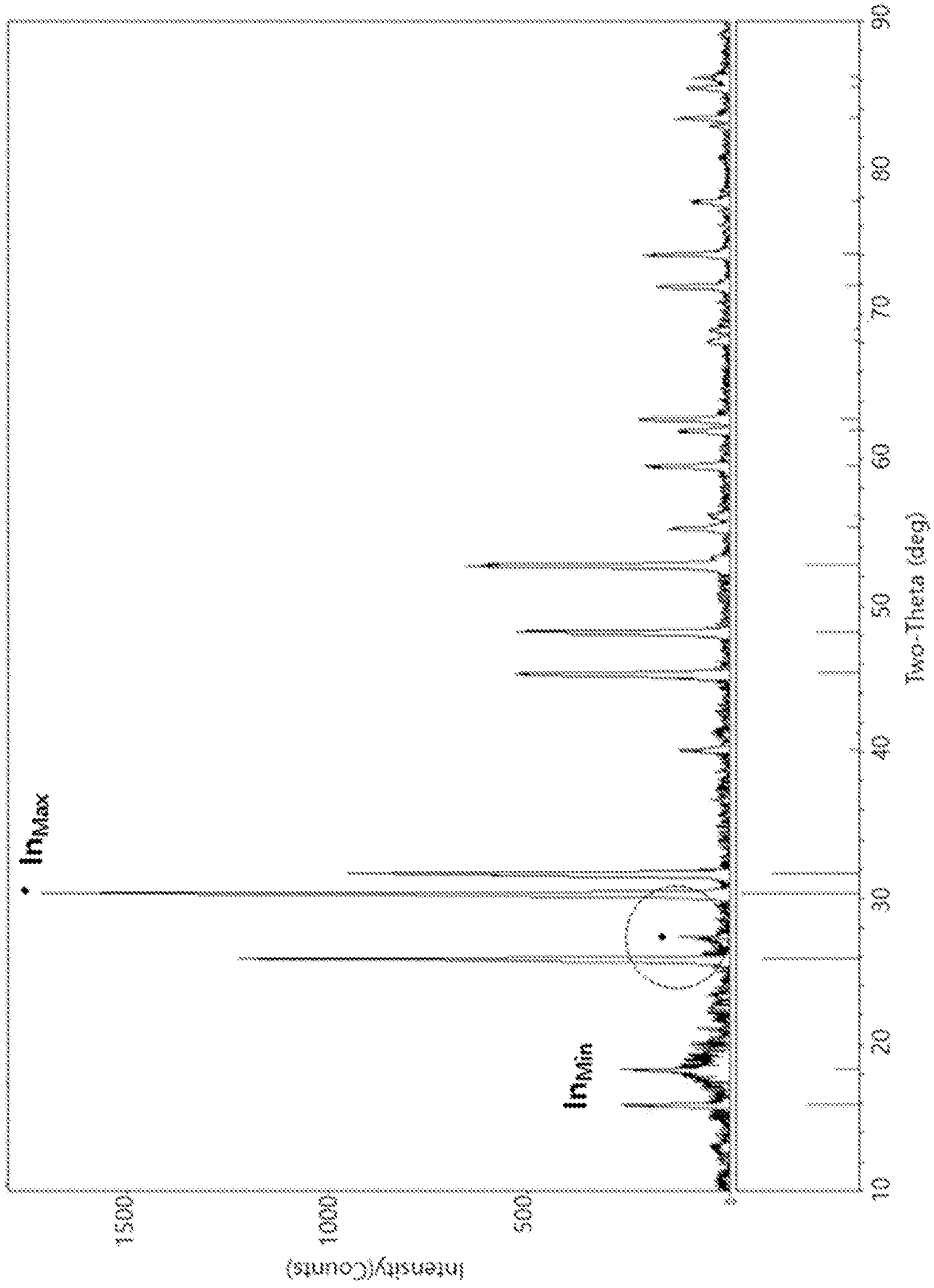
FIG. 2 is an X-ray diffraction pattern of an all-solid-state electrolyte compound prepared in Example 2.

An X-ray diffraction spectrum of powder obtained through the above process is shown in FIG. 2, in which $\ln_{max}$ indicates the maximum peak intensity, and $\ln_{min}$ indicates the peak intensity of lithium sulfide. The respective values thereof are shown in Table 1 below.

Example 3

As in Example 1, in the glove box filled with nitrogen, 12.637 g of LiCl, 34.237 g of $Li_2S$, 33.125 g of $P_2S_5$, and zirconia balls (130 g) with a diameter of 5 mm were introduced into a 150-mL polypropylene pot. Then, the glove box was sealed. Milling was performed at a rotation speed of 1,000 rpm for 10 minutes to obtain a primary reaction compound.

The primary reaction compound was introduced into a calcining furnace made of quartz, and a calcining step was then performed. The calcining step was composed of heating, maintaining, and cooling steps. In the heating step, the calcining furnace was heated at a rate of 3° C. per minute to increase a temperature up to 550° C. In the heating step, an argon purge process was performed up to a temperature of 150° C. From above the temperature of 150° C., the heating step was performed up to a temperature of 550° C. in a state without performing argon purging. After the heating step, the calcining furnace heated to a temperature of 550° C. was maintained for 6 hours to perform the maintaining step in which a reaction was performed. Even in the maintaining step, argon purging was not performed, and a closed system was maintained.

After maintaining the calcining furnace at a closed state at a temperature of 550° C. for 6 hours, the cooling step was performed. Cooling allowed the calcining furnace to reach room temperature through natural cooling. In the cooling step, argon purging was performed at a point where the cooling started.

Figure 3:
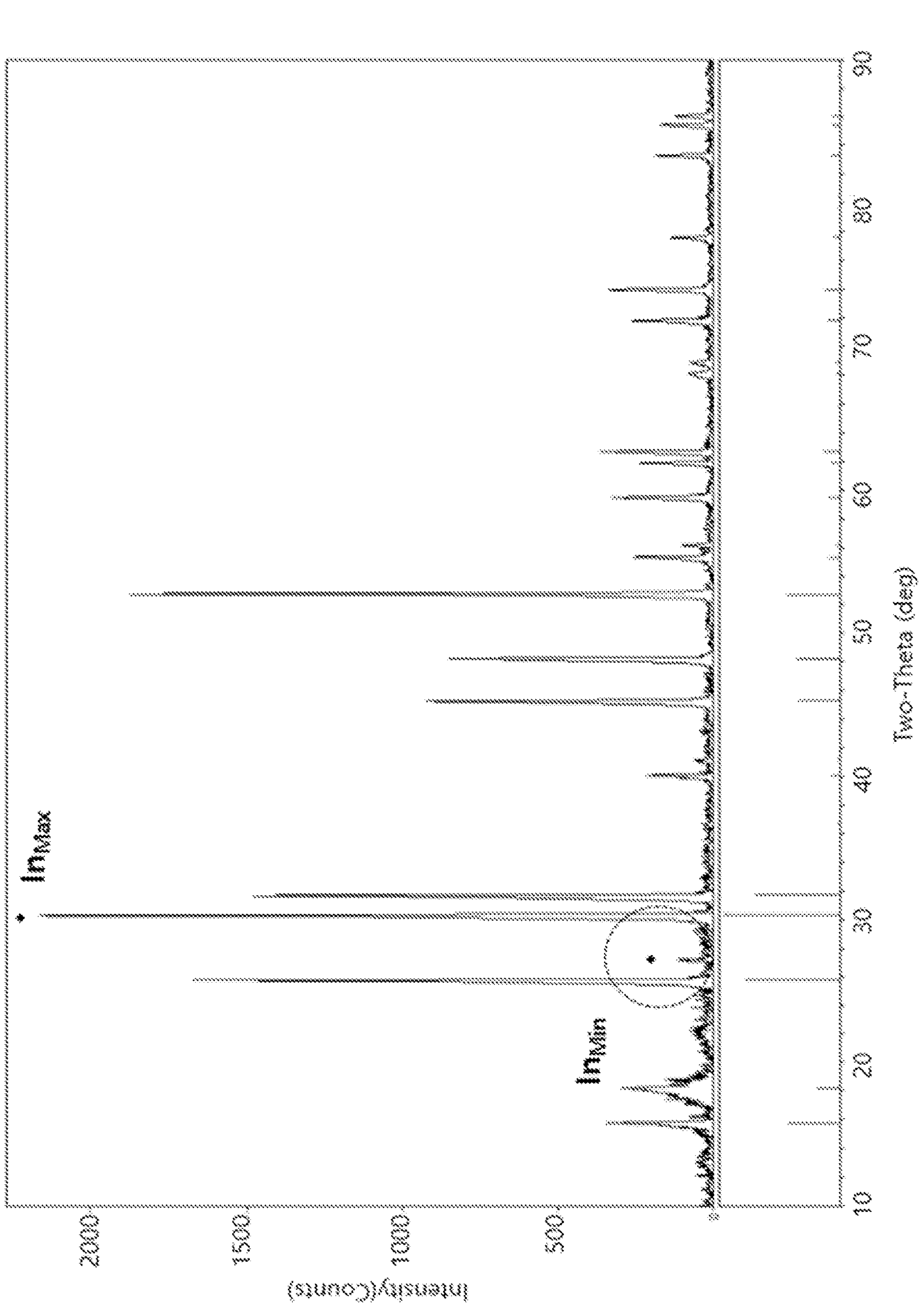
FIG. 3 is an X-ray diffraction pattern of an all-solid-state electrolyte compound prepared in Example 3.

An X-ray diffraction spectrum of powder obtained through the above process is shown in FIG. 3, in which $ln_{max}$ indicates the maximum peak intensity, and $ln_{min}$ indicates the peak intensity of lithium sulfide. The respective values thereof are shown in Table 1 below.

X-ray diffraction patterns in each Example were measured using Rigaku equipment under the following conditions.

In each Example, the solid electrolyte compound powder was applied on a glass having a diameter of 20 mm and a thickness of 0.2 mm to obtain a sample. This sample was measured using XRD film, without allowing the sample to be in contact with air. The 2θ position of the diffraction peak was determined by Le Bail analysis through RIETAN-FP, the XRD analysis program. D2 PHASER, a powder X-ray diffraction measuring device purchased from BRUKER Corporation, was used to perform the measurement under the following conditions:

Tube voltage: 30 kV

Tube current: 10 mA

X-ray wavelength: Cu-Kα ray (1.5418 Å)

Measurement range: 10.0°<2θ<90.0° (where 2θ represents a diffraction angle)

TABLE 1

| Classification | Intensity | | |
|---|---|---|---|
| | $ln_{Max}$ | $ln_{Min}$ | $ln_{Min}/ln_{Max}$ |
| Example 1 | 11.7 | 2.25 | 0.1923 |
| Example 2 | 11.8 | 0.7 | 0.0593 |
| Example 3 | 11.8 | 0.5 | 0.0424 |

According to the results shown in Table 1 above, the resulting material, referred to as the lnMax, was almost the same in all Examples, except for differing lnMin values. This is presumed to be because the entire lithium sulfide material was used in the reaction as a reactant Therefore, it is seen that reaction efficiency is improved in the order of Example 1, Example 2, and Example 3.

INDUSTRIAL APPLICABILITY

According to the present disclosure, reaction efficiency can be improved in the preparation of a solid electrolyte for a secondary battery, thereby obtaining a high-purity solid electrolyte.

The invention claimed is:

1. A method of preparing a solid electrolyte for a secondary battery, the method comprising:

S1 of preparing a raw material composition comprising phosphorus (P) sulfide, a lithium halide, and lithium sulfide;

S2 of mechanically milling the raw material composition in a milling container to obtain a compound; and S3 of calcining the compound obtained through the mechanical milling, wherein the S3 calcining comprises:

S3-a of providing the compound obtained through the mechanical milling in a calcining furnace;

S3-b of heating the calcining furnace to a temperature of 500° C. or higher;

S3-c of maintaining the calcining furnace at a temperature in a range of 500° C. to 600° C. for 4 hours to 10 hours; and S3-d of cooling the calcining furnace to room temperature, and wherein a purge process using argon (Ar) gas is performed only in the S3-b heating at a temperature of 150° C. or lower and the S3-d cooling, and wherein the S3-c maintaining is performed without the purge process using argon (Ar) gas in a closed system.

* * * * *